United States Patent
Bastide et al.

(10) Patent No.: US 10,832,482 B2
(45) Date of Patent: Nov. 10, 2020

(54) AUGMENTED REALITY LAYERS ENHANCEMENT

(71) Applicant: INTERNATIONAL BUSINESS MACHINES CORPORATION, Armonk, NY (US)

(72) Inventors: Paul R. Bastide, Boxford, MA (US); Liam S. Harpur, Skerries (IE); Lin Sun, Cary, NC (US); Matthew E. Broomhall, Goffstown, NH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/127,287

(22) Filed: Sep. 11, 2018

(65) Prior Publication Data

US 2020/0082625 A1    Mar. 12, 2020

(51) Int. Cl.
| | |
|---|---|
| *G06T 19/00* | (2011.01) |
| *G06T 15/20* | (2011.01) |
| *H04W 4/029* | (2018.01) |
| *G06F 3/01* | (2006.01) |
| *G06T 19/20* | (2011.01) |
| *H04L 29/06* | (2006.01) |

(52) U.S. Cl.
CPC ............ *G06T 19/006* (2013.01); *G06F 3/011* (2013.01); *G06T 15/20* (2013.01); *G06T 19/20* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 9,213,405 B2 | 12/2015 | Perez et al. | |
| 9,269,011 B1* | 2/2016 | Sikka | G06K 9/2081 |
| 10,248,440 B1* | 4/2019 | Sharifi | G06F 16/156 |
| 2009/0171901 A1* | 7/2009 | Bathiche | G06F 16/24573 |
| 2009/0216341 A1* | 8/2009 | Enkerud | G05B 19/042 |
| | | | 700/17 |

(Continued)

OTHER PUBLICATIONS

Larsen, "What human limitations are there to object tracking and recognition?", cognitive psychology, Accessed on Dec. 26, 2017, 1 page, https://cogsci.stackexchange.com/questions/6428/what-human-limitations-are-there-to-object-tracking-and-recognition.

(Continued)

*Primary Examiner* — Yingchun He
(74) *Attorney, Agent, or Firm* — James W. Kappos (57) ABSTRACT

Embodiments of the present invention disclose a method, computer program product, and system for enhancing augmented reality layers. The type of activity a user is engaged in during an augmented reality session is detected. A set of markers for display within the augmented reality session are detected. A useful markers threshold is determined and a set of priority markers of the set of the detected set of markers is generated. A set of layers for display based on the set of priority markers is generating. one or more markers of the set of priority markers to the generated set of layers is mapped. An ordered list of layers of the generated set of layers is generated, wherein the ordered list is prioritized based on a user activity interest value and the generated set of layers and associated mapped markers to the user via the augmented reality session are displayed.

12 Claims, 4 Drawing Sheets

(56) References Cited

U.S. PATENT DOCUMENTS

2012/0290511 A1* 11/2012 Frank .................... G06N 20/00
706/12
2012/0327119 A1   12/2012 Woo et al.
2016/0026253 A1*  1/2016 Bradski ................ G02B 27/225
345/8
2016/0171767 A1   6/2016 Anderson
2017/0309196 A1* 10/2017 Vangala ................. G09B 5/125

OTHER PUBLICATIONS

Rusch et al., "Directing driver attention with augmented reality cues", Accessed on Dec. 26, 2017, 11 pages, https://www.ncbi.nlm.nih.gov/pmc/articles/PMC3891797/.

* cited by examiner

AUGMENTED REALITY LAYERS ENHANCEMENT

BACKGROUND

The present invention relates generally to the field of augmented reality wearable devices and more particularly to enhancement of augmented reality visual layers.

Augmented reality (A/R) and the wearable devices that allow user engagement with augmented reality sessions are driving changes in user behaviors. Some of the changes in user behavior include new ways of sharing contact information, combining reality with games, and overlaying maps and map data with real world. The combination of live views overlaid with digital flags and markers, in an augmented reality session, enables useful information to be presented and acted on by the user in real time without the cumbersome interaction with a tertiary device. As augmented reality applications are integrated into the heads-up display, a new attention management problem is arising, AR marker overload. For instance, the augmented reality application presents an overwhelming number of markers. Therefore, it may be advantageous to optimize the number of markers in an augmented reality display to increase to efficiency and ease of use of the user's interaction with the augmented reality session.

SUMMARY

Embodiments of the present invention disclose a method, computer program product, and system for enhancing augmented reality layers. The type of activity a user is engaged in during an augmented reality session is detected. A set of markers for display within the augmented reality session are detected. A useful markers threshold is determined, wherein the useful markers threshold is a maximum number of augmented reality markers permitted to be displayed during a particular activity. A set of priority markers of the set of the detected set of markers is generated. A set of layers for display based on the set of priority markers is generating. one or more markers of the set of priority markers to the generated set of layers is mapped. An ordered list of layers of the generated set of layers is generated, wherein the ordered list is prioritized based on a user activity interest value and the generated set of layers and associated mapped markers to the user via the augmented reality session are displayed.

DETAILED DESCRIPTION

Embodiments of the present invention relate to the field of computing, and more particularly to enhancement of augmented reality visual layers. The following described exemplary embodiments provide a system, method, and program product to, among other things, detects the type of activity a user is engaged in, maps the activity to a marker when the activity crosses a usefulness threshold, and determines a set of markers used to generated augmented layers in the visual display of the digital reality session. Therefore, the present embodiment has the capacity to improve the technical field of augmented reality by increasing the efficiency of integration of social media metdata into visual layers of a digital reality session via an augmented reality device. It should be appreciated by those in the art the invention disclosed below may also be performed in a totally digital environment via a virtual reality device.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Many wearable device vendors, such as Oculus Rift™ (Facebook™), Google Glasses™, and Samsung™ Virtual Reality are driving changes in user behavior. Real world, or traditional information, is increasingly being presented in combination with augmented/virtual reality, or digital reality, via, for example, games, overlaying map information, and manipulation of digital objects integrated with traditional reality. Digital reality's combination of live views with digital flags and markers enable information to be presented to a user and allows or promotes user interaction. It should be appreciated that as digital reality device use increases, development of augmented reality assistance to users may also become more prevalent. It should be appreciated that all products and service names are trademarks of their respective owning entities.

In various digital reality sessions, for example augmented reality, markers are used to detect objects in a user's view in order to track objects the user may interact with. It may be advantageous to optimize the user engagement with augmented reality markers, in order to increases the efficiency of the distribution of information to a user via a display on an augmented reality device. It may be advantageous to detect the type of activity the person is engaged in, map the activity to a threshold associated with useful marker score, develop a priority order of markers in order to build layers based on the threshold of the priority of markers, and layer the markers in a set of priority layers. The useful marker threshold may be a pre-fixed by a government, A/R administrator, location-based value, etc.

For example, the useful marker may be determined from an additive smoothing or Laplace smoothing by associating a marker with a non-zero starting point and subsequently utilizing machine learning to determine a threshold based on utilization and engagement. In various embodiments of the invention, a social layer may be used in order to data-mine or capture social media data and build relationships with other users, points of interest, commercial entities, or other objects in the area, or other users with similar profiles, for example, similar health goals. This may enable various embodiments of the invention to implement a health filter such that only markers that are within a threshold of, for example, the user's health goals, will be prioritized. In various embodiments, the useful markers score associated with various markers in the user's view, communicated via a display via the user device, for example, user device 120. In various embodiments, deduplication may be used in order to increase the efficiency of marker prioritization and layer generation.

It may be further advantageous not to overwhelm the user with data labels that distract or disrupt the user experience. In order to increase the efficiency of the augmented reality device the labels and markers may be pre-filtered based on, for example, user activity, user profile, and social media, in order to determine a priority set of labels to display as opposed to showing all labels and markers and then refine the display based on, for example, eye movement.

Figure 1:
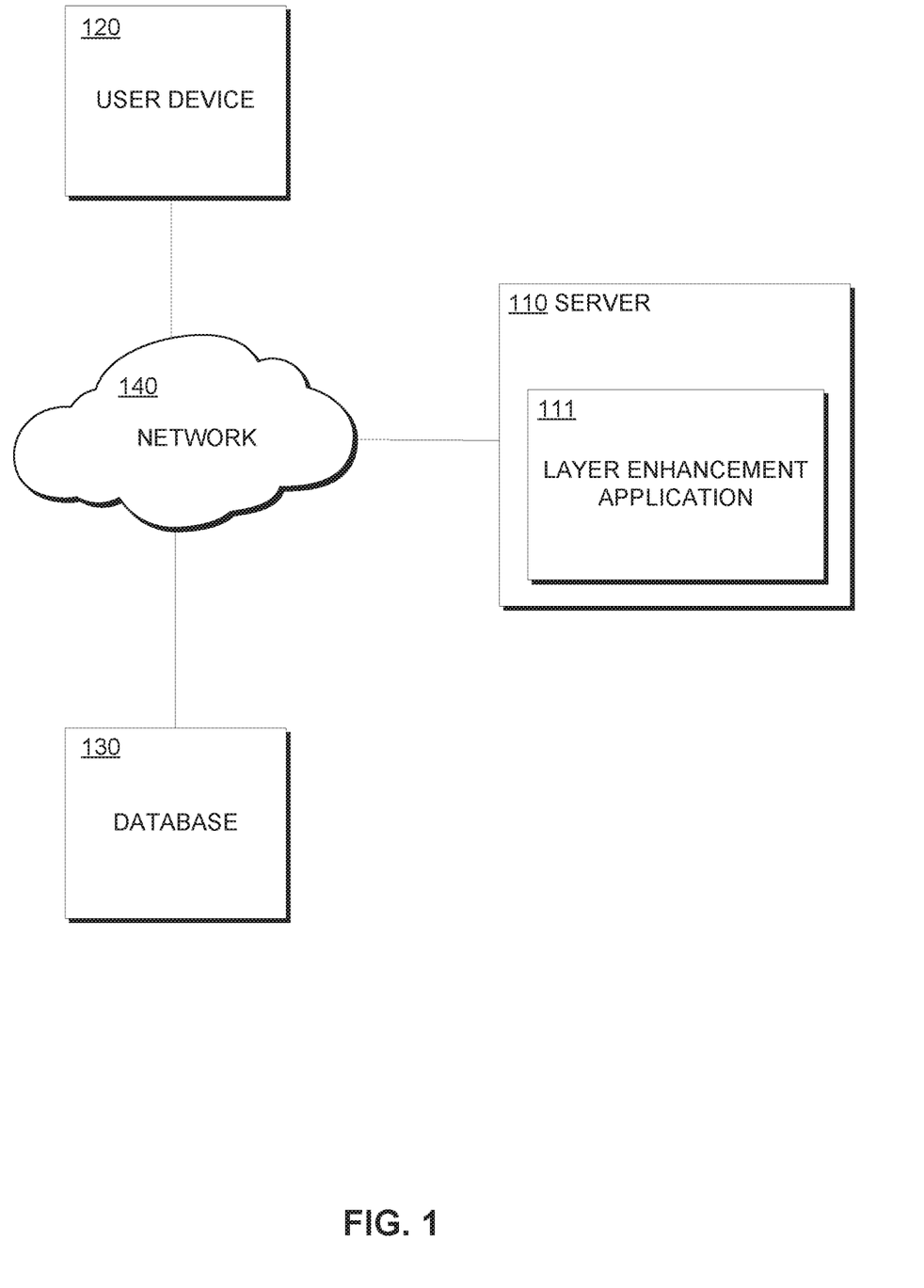
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. Distributed data processing environment 100 includes server 10, user device 120, and database 130, all interconnected via network 140.

Server 110, user device 120, and database 130 may be a laptop computer, tablet computer, netbook computer, personal computer (PC), a desktop computer, a smart phone, or any programmable electronic device capable of communicating via network, for example, network 140 and with various components and devices within distributed data processing environment 100. Server 110 includes layer enhancement application 111. layer enhancement application 111 may communicate with user device 120 and provide an audio or visual overlay to the augmented reality or virtual reality experience of the user. Server 110, user device 120, and database 130 may include internal and external hardware components, as depicted and described in further detail with respect to FIG. 4.

The user device 120 may be any programmable electronic device capable of display where the display is capable of providing a digital reality experience for the user. For example, the user device 120 may include, among other things, a virtual reality headset that provides a virtual reality experience for the wearer. Virtual reality headsets are widely used with computer games but they are also used in other applications, including simulators and trainers. They include a stereoscopic head-mounted display (providing separate images for each eye), stereo sound, and head motion tracking sensors (which may include gyroscopes, accelerometers, structured light systems, cameras, etc.). Some virtual reality headsets also have eye tracking sensors and gaming controllers.

The user device 120 may also be an augmented reality device. Augmented reality is a live direct or indirect view of a physical, real-world environment whose elements are augmented by computer-generated sensory input such as sound, video, graphics or Global Positioning System data. It is related to a more general concept called computer-mediated reality, in which a view of reality is modified (possibly even diminished rather than augmented) by a computer. Augmented reality enhances one's current perception of reality, whereas in contrast, virtual reality replaces the real world with a simulated one. Augmentation techniques are typically performed in real time and in semantic context with environmental elements, such as overlaying supplemental information like scores over a live video feed of a sporting event Like above, both virtual reality devices and augmented reality devices may be referred to collectively as digital reality devices for purposes of the following description.

It should be appreciated that user device 120 may be any programmable electronic device capable of conveying real world environments, completely virtual environments, or augmented reality environments.

Database 130 may act generally to perform datamining on social media websites to determine biases or norms associated with various users of the social media platform. Database 130 may be any database, server, or data storage medium that is capable of communication with server 110 and user device 120 via network 140. Database 130 may also datamine social behavior statistics related to various activities that take place in the real world within a specified geographic area. For example, walking in one geographic area may be a necessity in an urban environment where walking in another geographic area may be determined to be exercise in a stationary area, such as a fitness center, or rural area, where using a motor vehicle is the most common mode of transport. It should be appreciated that the function of database 130 may be performed in a datastore within server 110 or user device 120, in various embodiments of the present invention.

Network 140 can be, for example, a local area network (LAN), a wide area network (WAN) such as the Internet, or a combination of the two, and can include wired, wireless, or fiber optic connections. In general, network 140 can be any combination of connections and protocols that will support communications between server 110 and user device 120 along with any other components in distributed data processing environment 100.

In an embodiment, the user device 120 may operate as a digital reality display device while the layer enhancement application 111 may run primarily on the server 110. In an alternative embodiment, the layer enhancement application 111 may run primarily on the user device 120 while the server 110 may be used for processing and storage of data used by the layer enhancement application 111. It should be noted that the layer enhancement application 111 may be a standalone program or may be integrated into a larger application.

It should also be noted, that processing for the layer enhancement application 111 may be shared amongst the user device 120 and the server 110 in any ratio. In another embodiment, the layer enhancement application 111 may operate on more than one server, user device, or some combination of servers and user devices, for example, a plurality of user devices 120 communicating across the network 140 with a single server 110. In another embodiment, for example, the layer enhancement application 111 may operate on a plurality of servers 110 communicating across the network 140 with a plurality of user devices 120. Alternatively, the layer enhancement application 111 may operate on a network server communicating across the network with server 110 and one or more user devices 120.

In various embodiments of the present invention, layer enhancement application 111 may act generally to detect the type of activity a user is engaged in, map the activity to a plurality of markers when the activity crosses a usefulness threshold, based on an associated useful marker score, prioritize the plurality of markers and determines a set of markers of the plurality of markers in order to generated augmented layers associated with the augmented reality session the user is engaged in, and communicate the generated layers via the visual display of the digital reality session via the user device. The generation of layers being based on the prioritized markers.

Figure 2:
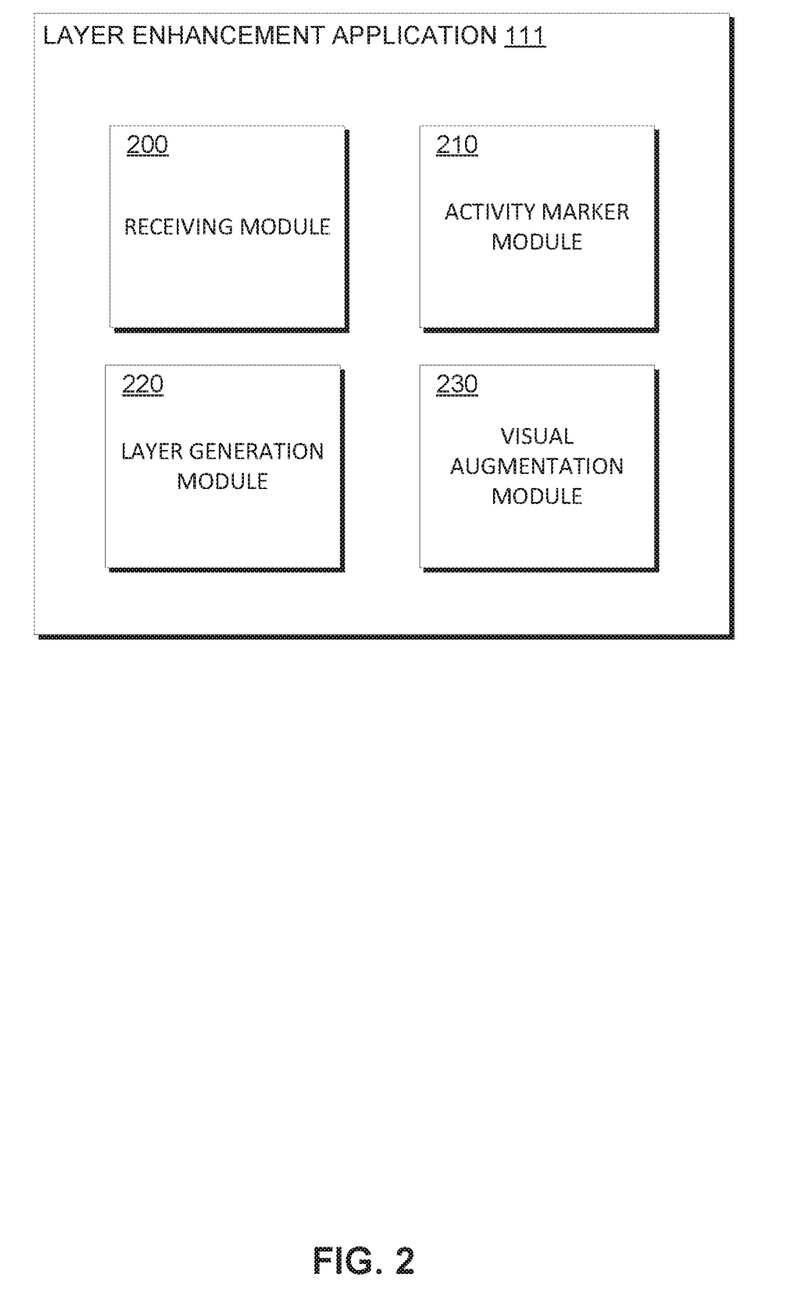
FIG. 2 is a functional block diagram illustrating the components of an application within the distributed data processing environment, in accordance with an embodiment of the present invention.

FIG. 2 is a functional block diagram illustrating the components of an application, for example, layer enhancement application 111, within server 110, within the distributed data processing environment 100, in accordance with an embodiment of the present invention. Layer enhancement application 111 includes receiving module 200, activity marker module 210, heat map module 220, and visual augmentation module 230.

In various embodiments, receiving module 200 receives social media data associated with the user along with the request that includes at least social media metadata and at least a set of geographic data associated with the user. The set of geographical data may include data received from a Global Positioning System on the user device 120 or on another device associated with the user's location. The set of social media metadata may further include data associated with login credentials associated with user input or a user profile. In various embodiments, the set of social media data may be data-mined from one or more social media websites, for example, by database 130 or user device 120. Receiving module 200 may communicate the social media data and associated user identification to activity marker module 210.

In various embodiments, receiving module 200 receives activity via remote monitors and mapping found in health devices and smart devices, such as various wearable devices which map a user's movement to the activity type, for example, swimming, running, walking, or biking, via sensors, for example gyroscopes or accelerometers. In various embodiments of the invention, receiving module 200 may receive GPS data in order to map activity and determine location patterns associated with the user engaged in a specific activity type. In various embodiments, receiving module 200 may also receive various sensor data correlating with activity based on the user's calendar. For example, receiving module 200 may receive calendar data indicating the user will has "Lunch with Fred at 11:45 AM at Main Street Café." At a time, within a threshold of the indicated time of the calendar event, receiving module 200 receives sensor data the user is sitting at the corresponding geographical location and maps the activity of the user to "sitting." In various embodiments of the invention, receiving module 200 may also receive activity data based on social history or social media datamining, for example, the user has tagged an object in Central Park and posted "Biking with Bill in Central Park!" every Wednesday, receiving module 200 may map movement activity on Wednesdays as "biking." In various embodiments, receiving module 200 communicates social media data, associated user identification, and associated activity categories to activity marker module 210.

In various embodiments, activity marker module 210 receives social media data and a corresponding user profile identification from receiving module 200. Activity marker module 210 may analyze social media data associated with the user and the user's profile information to map the activity to a useful markers threshold. The useful marker thresholds may be learned via various machine learning algorithms, where a random low value threshold is used as an initial condition. In various embodiments, the threshold is increased or decreased in response to received user feedback on activity type, or a number determined through geolocation votes. In various embodiments the useful marker thresholds may predetermined and stored in a database table. For example, a user profile may have a learned focus on exercise activities and activity marker module 200 may detect two bikes, or two other individuals on bicycles, in the users view associating biking with the two markers or "Biking equals 2 markers." Activity marker module 200 may detect four runners or 2 runners, a running shoe store, and a running trail head and associate the 4 objects with markers or "Running equals 4 markers". The objects in user's field of view may change therefore, in various embodiments of the invention, activity marker module 200 may periodically reanalyze the user's view and recalculate the markers in the user's view. In various embodiments, the time limit before recalculation is predetermined or determined via machine learning based on how the rate at which objects in the user's field of view historically change.

In an embodiment, layer generation module 220 receives mapped activity from activity marker module 210 and the associated useful marker score. Layer generation module 220 may capture continuous images of the user's point of view through the user device, for example, through a camera on an augmented reality device. In various embodiments of the invention, received markers may indicate, or be mapped to, changing features or elements in the scene. As the captured scene changes layer generation module 220 may track the change of position of objects, determine differences between frames at certain time intervals, and provide tracking of markers and the mapped objects through a changing visual field or scene.

In various embodiments of the invention, layer generation module 220 may generate a layer with an imbedded marker and may modify the marker within the layer. In various embodiments, the marker may be modified based on a count of occurrences of a specific marker within a field of view or scene. In various embodiment, a running total count of a specific marker may be determined, based on the total number of times the object associated with the marker appears during the duration of the digital reality session. In various embodiments of the invention, layer generation module 220 may aggregate the augmented reality markers from various received data. For example, online reviews, travel or leisure service recommendations, and/or user profile information may be analyzed to determine the user's interest level for the potential markers and develop a priority model for the user. The priority model associated with the user may be generated based on social media data or "interests." In various embodiments, interests may include, for example, food posts on social media, contacts within the user's social network or phone contact list, and/or experiences documented on social media analyzed with natural language processing. In various embodiments of the invention, the distance of an object from the user may be calculated and used to modify the useful marker score associated with the marker embedded in the generated layer. It should be appreciated that layer generation module 220 may dynamically detect objects not previously associated with markers to include in the generated based on various factors, for example, the objects prominence in the field of view of the user, the number of occurrences of the object within the field of view of the user, or user input.

Layer generation module 220 may generate a layer set based on the threshold. For example, for a restaurant in the view of the user Layer 1 may correspond to a name or "Urban Curry", or a restaurant type, for example, "Vegan Experience", Layer 2 may correspond to the restaurants Social Contacts, and Layer 3 may correspond to one or more experiences or reviews. Layer generation module 220 may communicate the generated layers to visual augmentation module 230.

Visual augmentation module 230 may prioritizes the layer presentation based on the threshold value and display the layers in digital reality session via the display of an augmented reality device, for example, one or more layers being associated with a specific color, overlaid on the user's devices display. The user may rotate the layers based on gesture, haptic feedback or a specific touch type input from the user, or the layers may automatically rotate on a timed frequency, at a logarithmic interval. For example, visual augmentation module 230 may display Layer 1 for 5 seconds, display Layer 2 for 2.5 seconds, display Layer 3 in response to user input and remove Layer 3 in response to a second user input.

Figure 3:
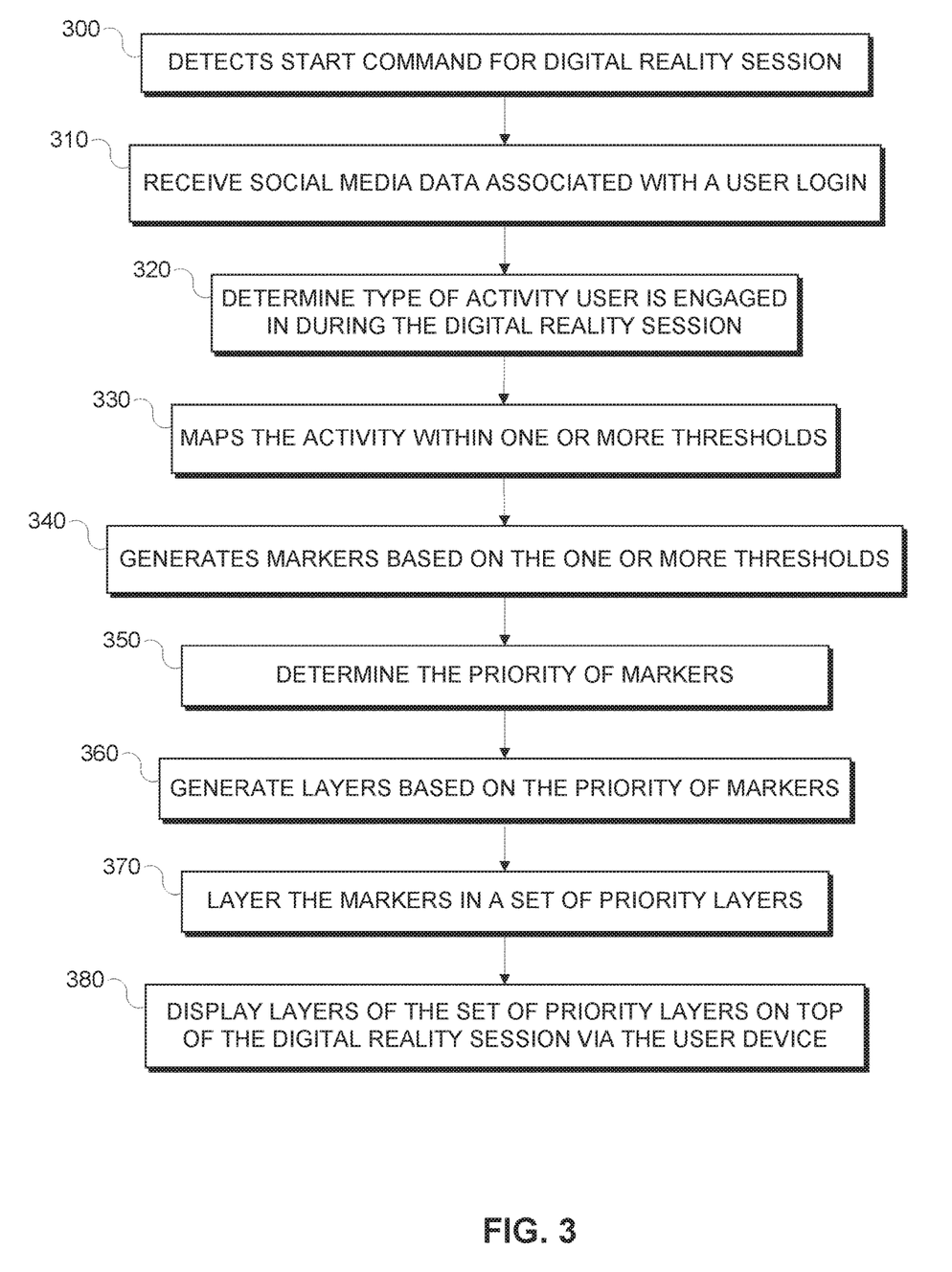
FIG. 3 is a flowchart depicting operational steps of an application, on a server computer within the data processing environment of FIG. 1, in accordance with an embodiment of the present invention.

FIG. 3 is a flowchart depicting operational steps of layer enhancement application 111, on server 110 within data processing environment 100 of FIG. 1, in accordance with an embodiment of the present invention. Receiving module 200 detects a start command for a digital reality session associated with a user identification (block 300). Receiving module 200 receives social media data associated with the user identification (block 310) from a datastore, for example, database 130. Receiving module 200 determines the type of reality session the user is engaged in and what type of activity the user is engaged in (block 320), for example, running, walking, riding a bike, etc. Receiving module 200 communicates the user identifications and associated social media data to activity marker module 210.

Activity marker module 210 analyzes the received social media data and activity data to map the activity to a potential threshold of a plurality of potential markers (block 330) for each associated user engaged in the digital reality session. In various embodiments, markers are points of interest and the threshold may be based on the prominence or distance from the user's perspective in the digital reality session. Activity marker module 210 determines markers of the potential markers that are above a threshold or between two thresholds (block 340) and communicates the determined markers to layer generation module 220.

Layer generation module 220 receives markers from activity marker module 210 and determines the priority of markers (block 350). The priority of markers may be based on the user's activity history, social media data, or physical relationship with the markers (distance, view location). Layer generation module 220 generates one or more layers to overlay onto the users display (block 360) based on the priority of markers. Layer generation module 220 communicates the generated layers and associated markers to visual augmentation module 230.

Visual augmentation module 230 receives the generated layers and associated markers from layer generation module 220. In various embodiments, visual augmentation module 230 prioritizes the layers and associated markers within each layer (block 370) based on a machine learning algorithm that determines which layer would be most useful to the user based on various factors, for example, the user's profile history and data from previous digital reality sessions. Visual augmentation module 230 displays the layers in the prioritized order within the user's view of the digital reality session such that the layer with the highest priority is most prominent (block 380). In various embodiments, visual augmentation module 230 updates the view and the priority of layers order based on the visual focus and movement of the user.

Figure 4:
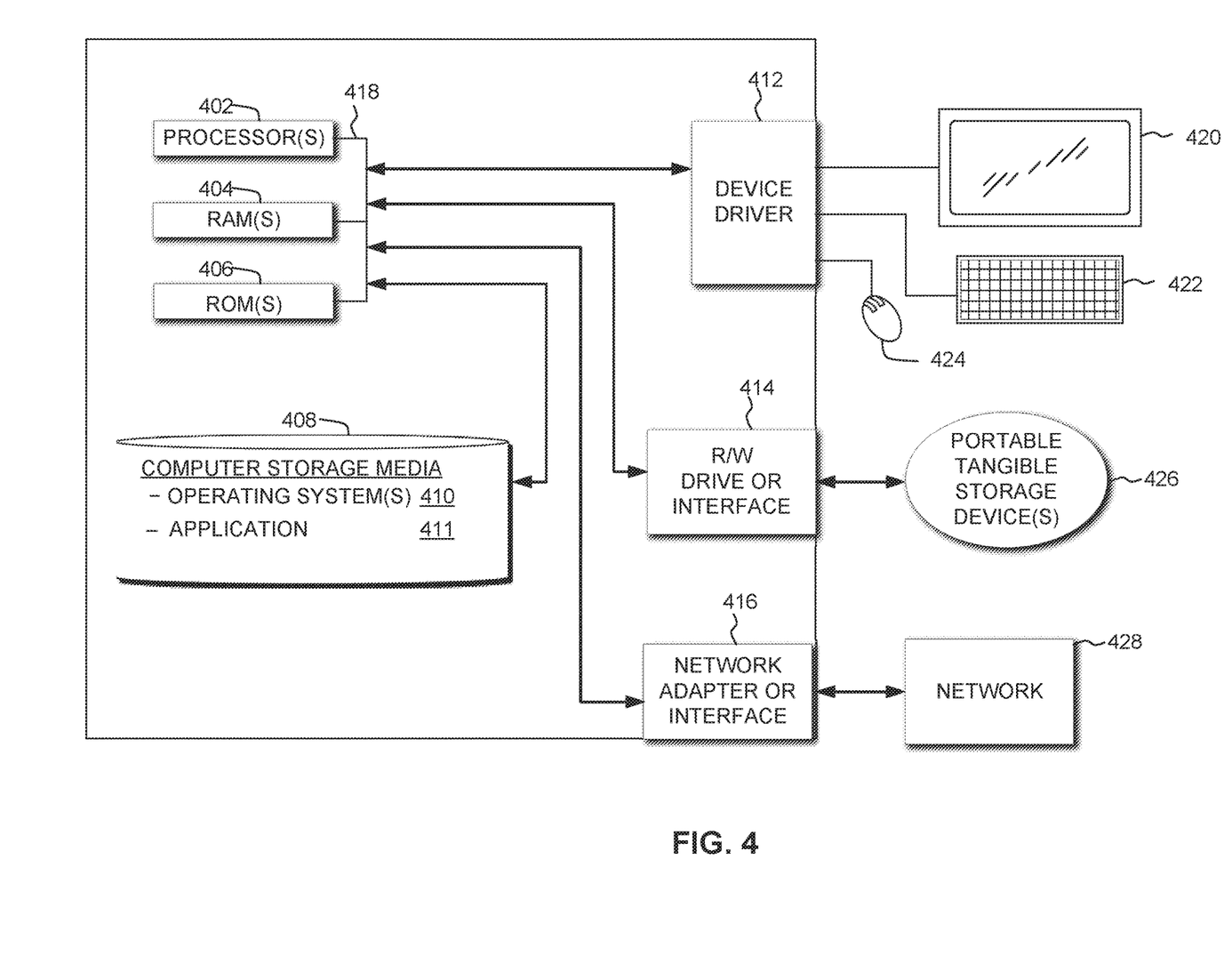
FIG. 4 depicts a block diagram of components of the server computer executing the application, in accordance with an embodiment of the present invention.

FIG. 4 depicts a block diagram of components of Server 110, user device 120, and database 130 of presentation control system 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Server 110, user device 120, and database 130 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, layer enhancement application 111, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 110, user device 120, and database 130 may also include a R/W drive or interface 414 to read from and write to one or more portable computer readable storage media 426. Application programs 411 on server 110, user device 120, and database 130 may be stored on one or more of the portable computer readable storage media 426, read via the respective R/W drive or interface 414 and loaded into the respective computer readable storage media 408.

Server 110, user device 120, and database 130 may also include a network adapter or interface 416, such as a TCP/IP adapter card or wireless communication adapter (such as a 4G wireless communication adapter using OFDMA technology) for connection to a network 428. Application programs 411 on server 110, user device 120, and database 130 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Server 110, user device 120, and database 130 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method for enhancing augmented reality layers, the method comprising:
   detecting the type of activity a user is engaged in during an augmented reality session;
   detecting a set of augmented reality markers for display within the augmented reality session;
   determining a useful markers threshold, wherein the useful markers threshold is a maximum number of augmented reality markers permitted to be displayed during a particular activity, and wherein the useful markers threshold is determined by applying one or more machine learning algorithms to the type of the particular activity the user is engaged in;
   generating a set of priority markers of the set of the detected set of markers, wherein generating the set of priority markers comprises:
      aggregating the augmented reality markers,
      analyzing the user's interest level for each augmented reality marker based on one or more factors from the group comprising the user's profile history and data from the user's previous digital reality sessions, and
      generating a priority model for the user based on the user's interest;
   generating a set of layers for display based on the set of priority markers;
   mapping one or more markers of the set of priority markers to the generated set of layers;
   generating an ordered list of layers of the generated set of layers wherein the ordered list is prioritized based on a user activity interest value; and
   displaying the generated set of layers and associated mapped markers to the user via the augmented reality session.

2. The method of claim 1, wherein the number of mapped markers per layer is equal to or less than the useful markers threshold.

3. The method of claim 1, wherein detecting the type of activity a user is engaged is based on one or more of motion sensors, activity patterns based on global positioning systems via wearable devices, calendar entries, and historic social media metadata.

4. The method of claim 1, wherein the useful markers threshold is determined by applying one or more machine learning algorithms to a predetermined value stored in a database, the user's calendar data, the user's geographical data, the user's social media data, and data from the augmented reality session.

5. A computer program product for enhancing augmented reality layers, the computer program product comprising:
   one or more computer-readable storage media and program instructions stored on the one or more computer-readable storage media, the program instructions comprising:
      instructions to detect the type of activity a user is engaged in during an augmented reality session;
      instructions to detect a set of augmented reality markers for display within the augmented reality session;
      instructions to determine a useful markers threshold, wherein the useful markers threshold is a maximum number of augmented reality markers permitted to be displayed during a particular activity, and wherein the useful markers threshold is determined by applying one or more machine learning algorithms to the type of the particular activity the user is engaged in;
      instructions to generate a set of priority markers of the set of the detected set of markers wherein instructions to generate a set of priority markers comprises:
         instructions to aggregate the augmented reality markers,
         instructions to analyze the user's interest level for each augmented reality marker based on one or more factors from the group comprising the user's profile history and data from the user's previous digital reality sessions, and
         instructions to generate a priority model for the user based on the user's interest;
      instructions to generate a set of layers for display based on the set of priority markers;
      instructions to map one or more markers of the set of priority markers to the generated set of layers;
      instructions to generate an ordered list of layers of the generated set of layers wherein the ordered list is prioritized based on a user activity interest value; and
      instructions to display the generated set of layers and associated mapped markers to the user via the augmented reality session.

6. The computer program product of claim 5, wherein the number of mapped markers per layer is equal to or less than the useful markers threshold.

7. The computer program product of claim 5, wherein instructions to detect the type of activity a user is engaged is based on one or more of motion sensors, activity patterns based on global positioning systems via wearable devices, calendar entries, and historic social media metadata.

8. The computer program product of claim 5, wherein the useful markers threshold is determined by applying one or more machine learning algorithms to a predetermined value stored in a database, the user's calendar data, the user's geographical data, the user's social media data, and data from the augmented reality session.

9. A computer system for enhancing augmented reality layers, the computer system comprising:
   one or more computer processors;
   one or more computer-readable storage media;
   program instructions stored on the computer-readable storage media for execution by at least one of the one or more processors, the program instructions comprising:
   instructions to detect the type of activity a user is engaged in during an augmented reality session;
   instructions to detect a set of augmented reality markers for display within the augmented reality session;
   instructions to determine a useful markers threshold, wherein the useful markers threshold is a maximum number of augmented reality markers permitted to be displayed during a particular activity, and wherein the useful markers threshold is determined by applying one or more machine learning algorithms to the type of the particular activity the user is engaged in;

instructions to generate a set of priority markers of the set of the detected set of markers wherein instructions to generate a set of priority markers comprises:
  instructions to aggregate the augmented reality markers,
  instructions to analyze the user's interest level for each augmented reality marker based on one or more factors from the group comprising the user's profile history and data from the user's previous digital reality sessions, and
  instructions to generate a priority model for the user based on the user's interest;
instructions to generate a set of layers for display based on the set of priority markers;
instructions to map one or more markers of the set of priority markers to the generated set of layers;
instructions to generate an ordered list of layers of the generated set of layers wherein the ordered list is prioritized based on a user activity interest value; and
instructions to display the generated set of layers and associated mapped markers to the user via the augmented reality session.

10. The computer system of claim 9, wherein the number of mapped markers per layer is equal to or less than the useful markers threshold.

11. The computer system of claim 9, wherein instructions to detect the type of activity a user is engaged is based on one or more of motion sensors, activity patterns based on global positioning systems via wearable devices, calendar entries, and historic social media metadata.

12. The computer system of claim 9, wherein the useful markers threshold is determined by applying one or more machine learning algorithms to a predetermined value stored in a database, the user's calendar data, the user's geographical data, the user's social media data, and data from the augmented reality session.

* * * * *